US009860149B2

(12) United States Patent
Hayton

(10) Patent No.: US 9,860,149 B2
(45) Date of Patent: Jan. 2, 2018

(54) CONTINUOUS MONITORING OF DATA SERVERS USING A SHADOWING PROXY

(71) Applicant: Citrix Systems, Inc., Fort Lauderdale, FL (US)

(72) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 182 days.

(21) Appl. No.: 14/823,268

(22) Filed: Aug. 11, 2015

(65) Prior Publication Data

US 2017/0048125 A1    Feb. 16, 2017

(51) Int. Cl.
| | |
|---|---|
| H04L 12/26 | (2006.01) |
| H04L 12/58 | (2006.01) |
| H04L 29/08 | (2006.01) |
| G06F 1/32 | (2006.01) |
| H04L 29/06 | (2006.01) |

(52) U.S. Cl.
CPC ............ *H04L 43/10* (2013.01); *G06F 1/3296* (2013.01); *H04L 51/24* (2013.01); *H04L 51/38* (2013.01); *H04L 63/083* (2013.01); *H04L 67/28* (2013.01); *H04L 67/306* (2013.01); *H04L 67/42* (2013.01)

(58) Field of Classification Search
CPC ....................................................... H04L 43/10
USPC ............................................................ 726/7
See application file for complete search history.

(56) References Cited

U.S. PATENT DOCUMENTS

2010/0083255 A1    4/2010  Bane et al.

FOREIGN PATENT DOCUMENTS

| EP | 2154922 A1 | 2/2010 |
|---|---|---|
| WO | 2010040092 A1 | 4/2010 |

OTHER PUBLICATIONS

Mar. 23, 2016 (WO) International Search Report and Written Opinion—App. PCT/US2015/045647.

*Primary Examiner* — Jacob Lipman
(74) *Attorney, Agent, or Firm* — Banner & Witcoff, Ltd.

(57) ABSTRACT

Methods, systems, and computer-readable media for providing monitoring of data servers are presented. In some embodiments, a computing platform may receive, from a computing device, a first polling request associated with a user account, while a client proxy associated with the user account is operating in a passive mode. Subsequently, the computing platform may forward the first polling request to a server associated with the user account. Next, the computing platform may detect that the computing device is asleep. In response to detecting that the computing device is asleep, the computing platform may initiate an active mode of the client proxy. Subsequently, the computing platform may send a second polling request to the server. Thereafter, the computing platform may determine to wake the computing device based on a polling response. In response to determining to wake the computing device, the computing platform may send, to the computing device, a notification.

20 Claims, 11 Drawing Sheets

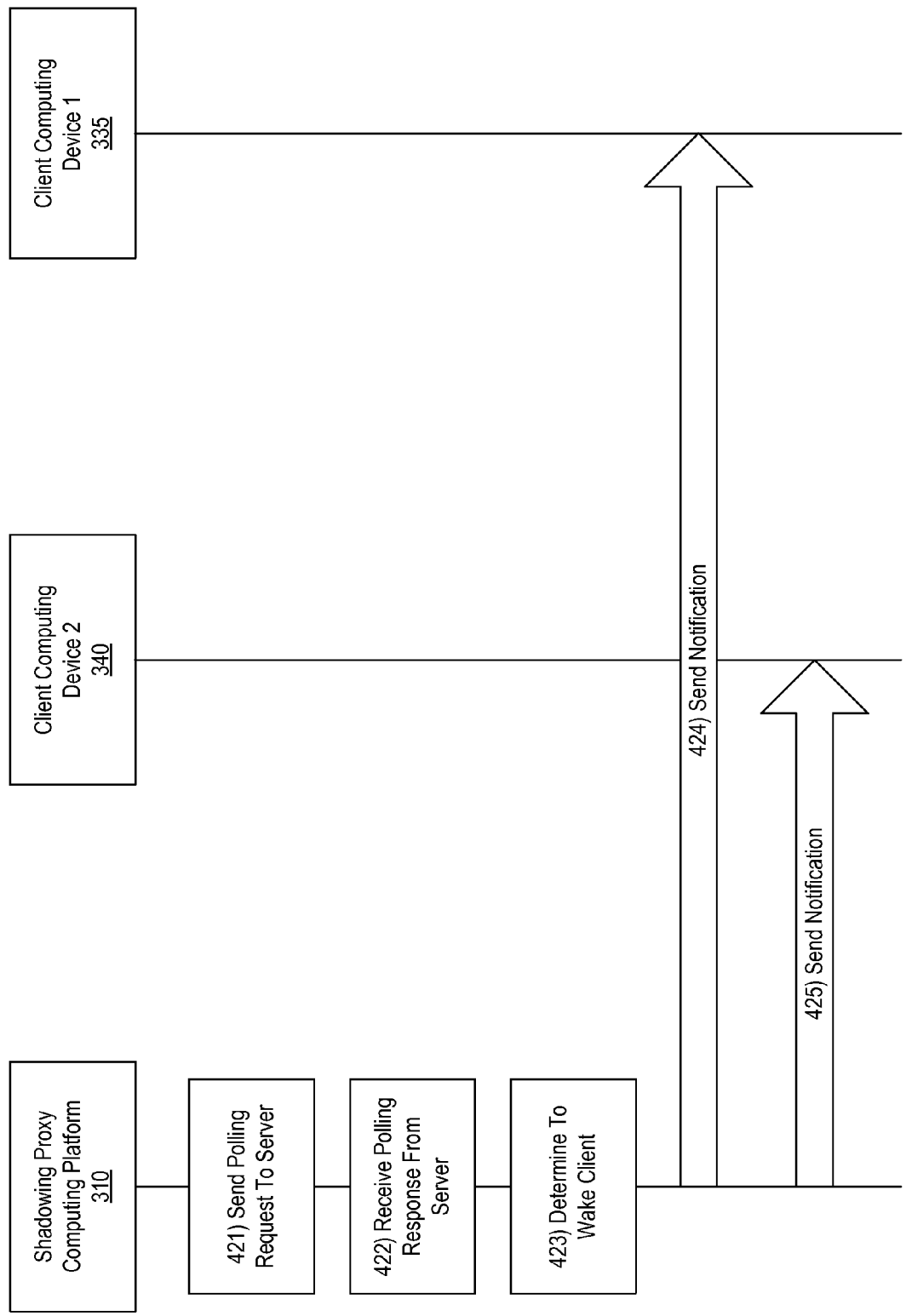

CONTINUOUS MONITORING OF DATA SERVERS USING A SHADOWING PROXY

FIELD

Aspects of the disclosure relate to computer hardware and software. In particular, one or more aspects of the disclosure generally relate to computer hardware and software for providing continuous monitoring of data servers using a shadowing proxy.

BACKGROUND

Many electronic data services, such as electronic mail or "email," are provided on client computing devices using client applications, such as email client applications. Typically, such client applications are configured to periodically connect to and/or poll a central service and/or a central server providing such a service to check for updated data, such as new email messages, as well as any other information that may be exchanged between the server and the client.

In connecting to and/or polling the central server, the client application and/or the client computing device may consume limited battery resources, limited processing resources, and limited network bandwidth resources. In attempting to reduce such resource consumption, however, the client application and/or the client computing device might be prevented from running or might be exited prematurely. As a result, there may be instances in which client applications and/or users of such applications are not informed when new information is available, such as when new email is delivered, or when other significant changes occur.

SUMMARY

Aspects of the disclosure provide efficient, effective, convenient, and scalable ways of addressing these and/or other issues using a shadowing proxy that can provide continuous monitoring of one or more data servers.

For example, and as illustrated in greater detail below, one way to address one or more of the issues identified above is to provide a proxy server that runs on behalf of all of the client applications and monitors the one or more servers in place of the client applications. When a significant change is noted, such as new data like a new email message becoming available, then the appropriate client application and/or client computing device may be notified, for instance, using a notification service to send a notification. On its own, however, this arrangement may create other issues. For instance, because the proxy server would need to be able to act on behalf of all of the client applications, it might require the ability to impersonate all users, which can raise potential security concerns. In addition, the proxy server might need to scale to support a relatively large number of client devices. For example, a given organization may wish to support a minimum of one device per user using such a proxy server, and for a large enterprise organization, this might easily run into the tens to hundreds of thousands of client devices. This can raise significant scalability challenges.

By implementing a proxy server in accordance with one or more aspects of the disclosure, however, these and/or other issues may be overcome. For example, and as illustrated in greater detail below, a proxy server implementing one or more aspects of the disclosure may utilize a modal approach to monitoring a data server on behalf of one or more clients. For instance, while a client is actively able to talk to a data server, the proxy server may act in a passive mode to consume minimal resources. Once a client fails, however, the proxy server may switch into an active mode in which the proxy server monitors the data server on behalf of the client and notifies the client when a significant event occurs, such as when new email is received. Advantageously, and as illustrated in greater detail below, the proxy server can leverage the credentials that it sees when it is operating in the passive mode, such that when the proxy server transitions into the active mode, it might not require explicit access to a particular user's full credentials. In addition, because the proxy server only needs to be active for a portion of an entire client population, the proxy server may be able to support a relatively larger number of clients than if the proxy server were not able to switch between modes when monitoring various servers for various clients.

In accordance with one or more embodiments, a shadowing proxy computing platform having at least one processor, a memory, and a communication interface may receive, via the communication interface, and from a first client computing device, a first polling request associated with a first user account, while a smart client proxy associated with the first user account is operating in a passive mode. Subsequently, the shadowing proxy computing platform may forward, via the communication interface, the first polling request to a server associated with the first user account, while the smart client proxy associated with the first user account is operating in the passive mode. Thereafter, the shadowing proxy computing platform may detect that the first client computing device is asleep. In response to detecting that the first client computing device is asleep, the shadowing proxy computing platform may initiate an active mode of the smart client proxy associated with the first user account. Then, the shadowing proxy computing platform may send, via the communication interface, a second polling request to the server associated with the first user account, while the smart client proxy associated with the first user account is operating in the active mode. Thereafter, the shadowing proxy computing platform may determine to wake the first client computing device based on a polling response associated with the second polling request. In response to determining to wake the first client computing device based on the polling response associated with the second polling request, the shadowing proxy computing platform may send, via the communication interface, and to the first client computing device, a notification to wake the first client computing device.

In some embodiments prior to receiving the first polling request associated with the first user account, the shadowing proxy computing platform may receive, via the communication interface, and from the first client computing device, a request to register for proxy monitoring of the server associated with the first user account. Subsequently, the shadowing proxy computing platform may store registration information associated with the request to register for proxy monitoring of the server associated with the first user account. Thereafter, the shadowing proxy computing platform may send, via the communication interface, and to the first client computing device, configuration information associated with the proxy monitoring of the server associated with the first user account.

In some instances, after sending the configuration information associated with the proxy monitoring of the server associated with the first user account, the shadowing proxy computing platform may send, via the communication interface, and to a second client computing device, second configuration information associated with the proxy monitoring of the server associated with the first user account.

In some embodiments, the shadowing proxy computing platform may provide a second smart client proxy for a second user account different from the first user account.

In some embodiments, prior to forwarding the first polling request to the server associated with the first user account, the shadowing proxy computing platform may store one or more credentials for accessing the server associated with the first user account, and the one or more credentials for accessing the server associated with the first user account may be received from the first client computing device with the first polling request.

In some instances, the one or more credentials for accessing the server associated with the first user account may include one or more long-lived credentials, including one or more of a username associated with the first user account or a password associated with the first user account. In some instances, sending the second polling request to the server associated with the first user account may include sending the one or more long-lived credentials to the server associated with the first user account.

In some embodiments, after forwarding the first polling request to the server associated with the first user account, the shadowing proxy computing platform may receive, via the communication interface, a first polling response from the server associated with the first user account. Subsequently, the shadowing proxy computing platform may send, via the communication interface, to the first client computing device, the first polling response received from the server associated with the first user account.

In some instances, the first polling response received from the server associated with the first user account may include one or more short-lived credentials for accessing the server associated with the first user account. In some instances, the shadowing proxy computing platform may store the one or more short-lived credentials for accessing the server associated with the first user account.

In some instances, the one or more short-lived credentials for accessing the server associated with the first user account include at least one session cookie. In some instances, sending the second polling request to the server associated with the first user account may include sending, to the server associated with the first user account, session information associated with the one or more short-lived credentials.

In some embodiments, detecting that the first client computing device is asleep may include determining that a subsequent polling request has not been received from the first client computing device after a predetermined amount of time elapses from a time when a last polling request was received from the first client computing device.

In some embodiments, in response to detecting that the first client computing device is asleep, the shadowing proxy computing platform may send, via the communication interface, to a second client computing device associated with the first user account, a command configured to cause the second client computing device associated with the first user account to enter a sleep mode.

In some embodiments, determining to wake the first client computing device based on the polling response associated with the second polling request may include determining to wake the first client computing device based on the polling response associated with the second polling request indicating that new data is available at the server for the first user account.

In some embodiments, determining to wake the first client computing device based on the polling response associated with the second polling request may include determining to wake the first client computing device based on the polling response associated with the second polling request indicating that one or more stored credentials used in accessing the server associated with the first user account have expired.

In some embodiments, after sending the notification to wake the first client computing device, the shadowing proxy computing platform may send, via the communication interface, and to a second client computing device associated with the first user account, a notification to wake the second client computing device associated with the first user account.

In some embodiments, after sending the notification to wake the first client computing device, the shadowing proxy computing platform may receive, via the communication interface, and from the first client computing device, a third polling request associated with the first user account, while the smart client proxy associated with the first user account is operating in the active mode. In response to receiving the third polling request associated with the first user account from the first client computing device, the shadowing proxy computing platform may initiate the passive mode of the smart client proxy associated with the first user account.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIGS. 4A-4G depict an example event sequence for providing continuous monitoring of data servers using a shadowing proxy in accordance with one or more example embodiments.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As noted above, certain embodiments are discussed herein that relate to providing continuous monitoring of data servers using a shadowing proxy. Before discussing these concepts in greater detail, however, several examples of a computing device that may be used in implementing and/or otherwise providing various aspects of the disclosure will first be discussed with respect to FIG. 1.

Figure 1:
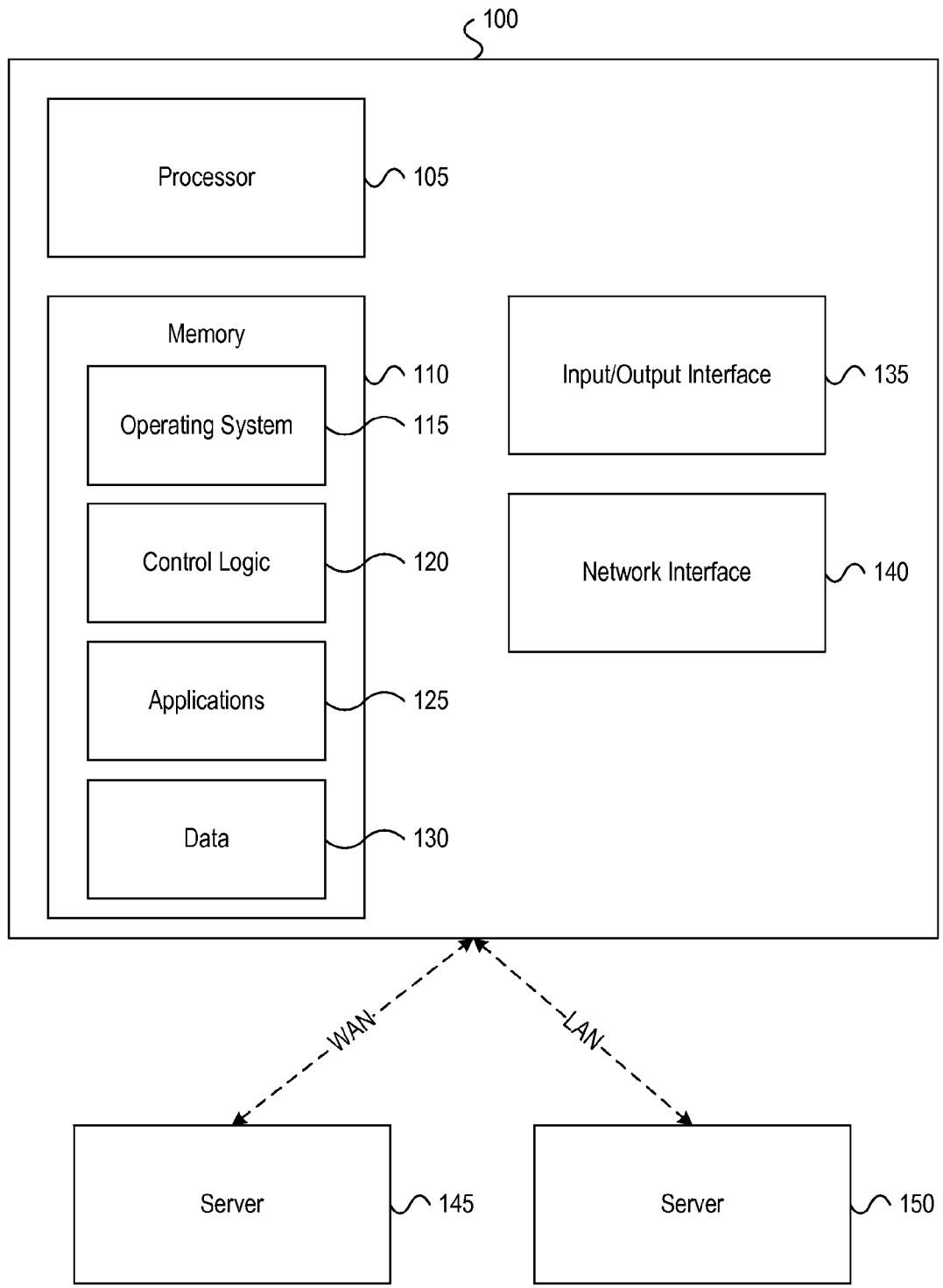
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing continuous monitoring of data servers using a shadowing proxy. In the description below, various examples illustrating how continuous monitoring of data servers may be provided using a shadowing proxy in accordance with one or more embodiments will be discussed.

Figure 2:
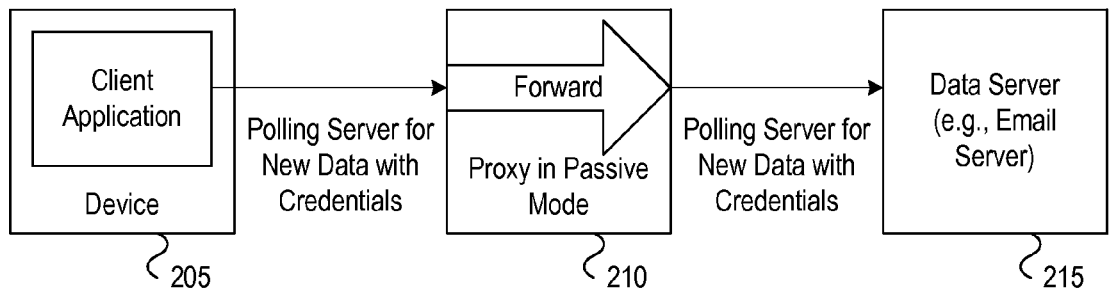
FIG. 2 depicts an example of providing continuous monitoring of data servers using a shadowing proxy in accordance with one or more example embodiments.
Figure 2:
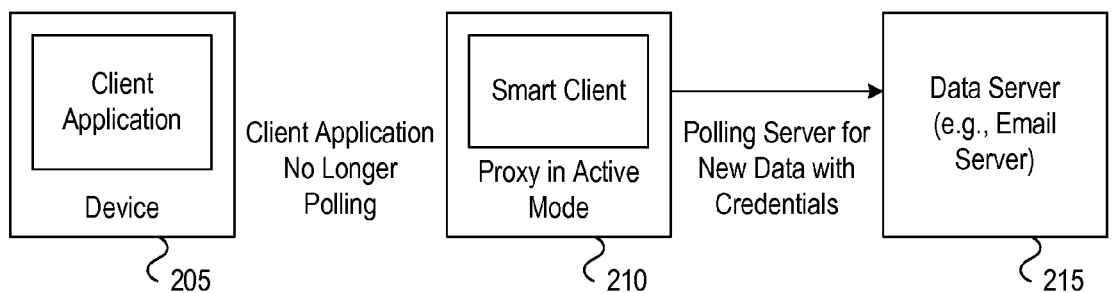
Figure 2:
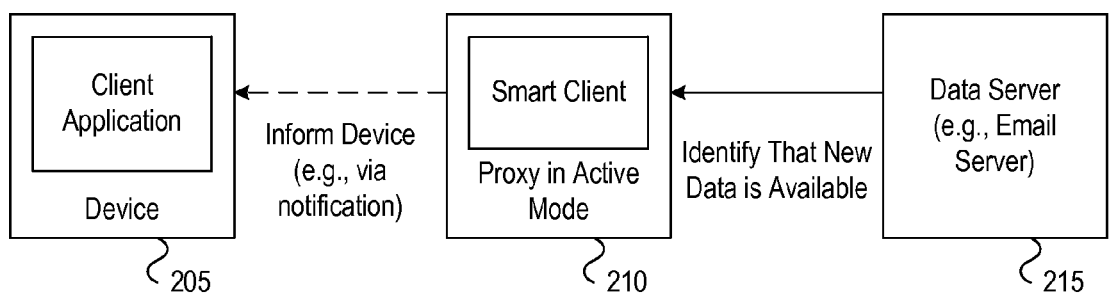

FIG. 2 depicts an example of providing continuous monitoring of data servers using a shadowing proxy in accordance with one or more example embodiments. Referring to FIG. 2, an example life cycle of a proxy that implements one or more aspects of the disclosure is illustrated.

In particular, in State A, a client application is running on client device 205 and the proxy, which is running on computing platform 210, is passively forwarding requests to the data server 215. In doing this, the proxy consumes minimal resources, thus allowing scale. In this passive state, the proxy may pass and/or intercept any authentication headers, cookies, and/or the like which may be used by the client application on device 205 in communicating with data server 215. In addition, in this passive state, the proxy may monitor for connection failure, but might not need to process the communications between device 205 and data server 215 at a higher level.

Continuing to refer to FIG. 2, in State B, the proxy running on computing platform 210 may have detected that the client application on client device 205 has ceased monitoring the data server 215. This may be because the client application on client device 205 has failed, been exited by the operating system on client device 205, because of network issues experienced by client device 205, and/or because of other issues. Upon detecting that the client application on client device 205 has ceased monitoring the data server 215, the proxy running on the computing platform 210 may begin acting on behalf of the client application on client device 205. To do this, the proxy running on the computing platform 210 may leverage credentials captured during State A and may use appropriate high-level protocols to detect significant events from the server 215. Such an event may, for example, include the delivery of an email to the user's inbox, or the delivery of a message tagged in some way as being important. If, during this monitoring the client application on client device 205 reconnects to the proxy on computing platform 210 while the proxy on computing platform 210 is monitoring data server 215 on behalf of the client application on client device 205, the proxy on computing platform 210 may fall back to the passive mode illustrated as State A and discussed above.

On the other hand, after the active proxy on computing platform 210 detects a significant event on data server 215, the proxy may send an event to the user of client device 205, for instance, by using a notification system, such as a push notification service, to send an event to client device 205, as seen in State C illustrated in FIG. 2. This event (which may, e.g., be sent to client device 205 by the proxy on computing platform 210) may contain information for the user of client device 205, such as the details of the received email message, and/or information for the client application on client device 205, such as an update to the number of 'unread' emails and/or an indication that the client application should run. After sending such a notification, as seen in State C, the proxy on computing platform 210 may exit, or in some instances, may continue running so as to detect additional events, such as the delivery of new email messages.

In connecting to and/or retrieving data from data server 215, the proxy on computing platform 210 may use credentials 'borrowed' from the active client application on client device 205. Additionally or alternatively, the proxy on computing platform 210 may use an external credential store. Additionally or alternatively, the proxy on computing platform 210 may use a trusted path to data server 215, so as to avoid the need for credentials. The proxy on computing platform 210 may also detect or anticipate if credentials that were previously being used by the proxy on computing platform 210 have timed out or otherwise expired. For example, if the proxy on computing platform 210 is using a session cookie to connect to and/or retrieve data from data server 215, then when the cookie times out, the proxy on computing platform 210 may alert client device 205 and/or warn the client application on client device 205 that the proxy on computing platform 210 is no longer able to monitor data server 215 for events. Such a notification may, for instance, cause the client application on client device 205 and reestablish the connection to the proxy on computing platform 210.

Advantageously, the approach implemented by this example proxy may be relatively scalable, as at any one time, the proxy on computing platform 210 might not need to monitor data server 215 on behalf of all client applications and/or client devices in a given population. In addition, because the proxy on computing platform 210 might not need to maintain persistent credentials for all users in a given population, the approach implemented by this example proxy also may be relatively secure. Furthermore, by using this example proxy, resource consumption (e.g., consumption of limited processing resources, consumption of limited power and/or battery resources, and/or consumption of limited network resources, etc.) on client devices may be reduced than if such clients were in a permanently active and monitoring state.

Figure 3:
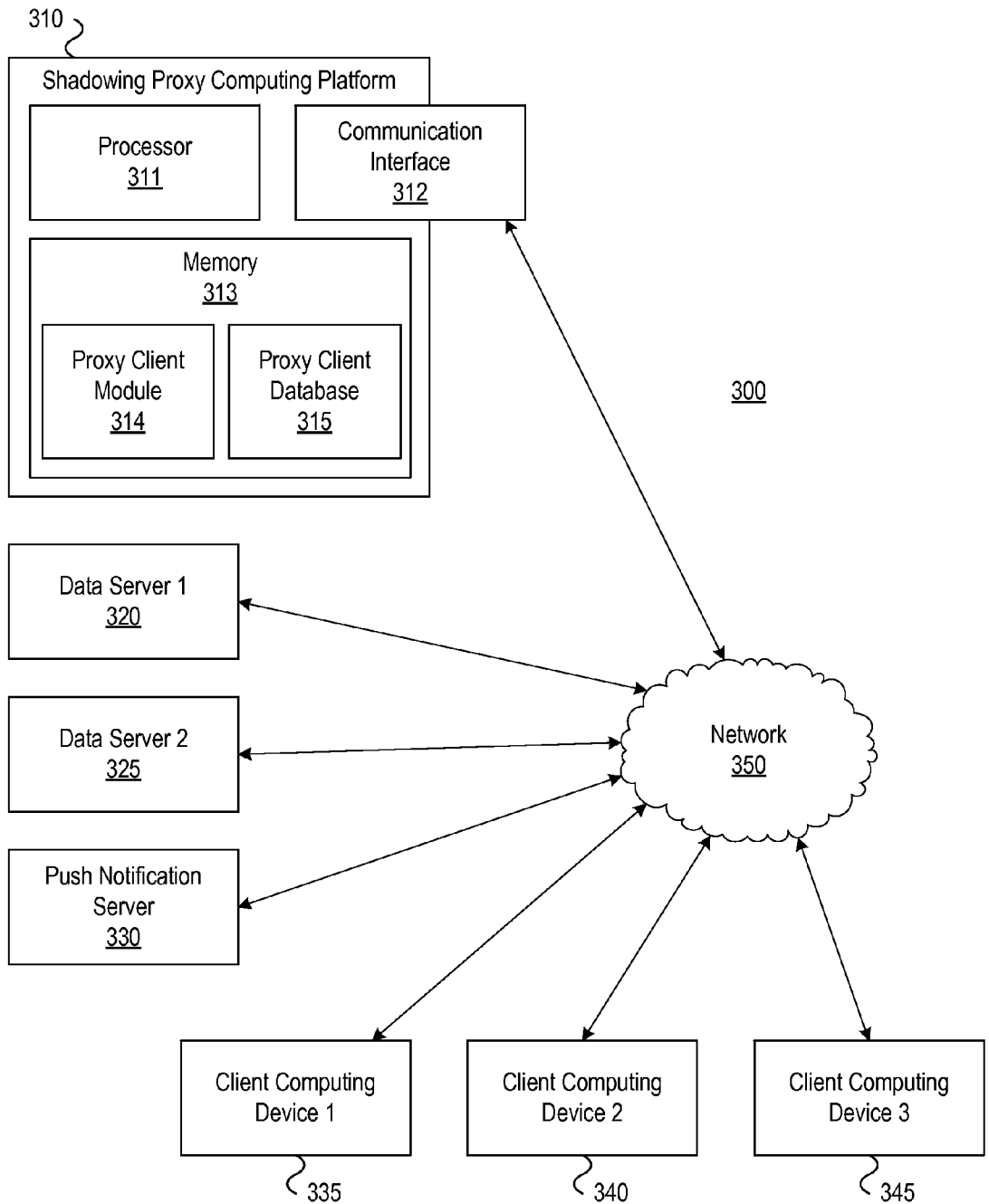
FIG. 3 depicts an illustrative computing environment for providing continuous monitoring of data servers using a shadowing proxy in accordance with one or more example embodiments.

FIG. 3 depicts an illustrative computing environment for providing continuous monitoring of data servers using a shadowing proxy in accordance with one or more example embodiments. Referring to FIG. 3, computing environment 300 may include one or more computing devices. For example, computing environment 300 may include one or more client computing devices, such as client computing device 335 (which may, e.g., be owned, operated, and/or otherwise used by a first user of a shadowing proxy server), client computing device 340 (which may, e.g., also be owned, operated, and/or otherwise used by the first user of a shadowing proxy server), and client computing device 345 (which may, e.g., be owned, operated, and/or otherwise used by a second user of a shadowing proxy server different from the first user of the shadowing proxy server). In some instances, client computing device 335, client computing device 340, and client computing device 345 may implement, incorporate, and/or otherwise include one or more aspects of computing device 100. Client computing device 335, client computing device 340, and client computing device 345 may be any type of computing device capable of receiving and processing input via one or more user interfaces, providing output via one or more user interfaces and communicating input, output, and/or other information to and/or from one or more other computing devices. For example, client computing device 335, client computing device 340, and client computing device 345 may be desktop computers, laptop computers, tablet computers, smart phones, or the like. In addition, and as illustrated in greater detail below, any and/or all of client computing device 335, client computing device 340, and client computing device 345 may, in some instances, be special-purpose computing devices configured to perform specific functions.

Computing environment 300 also may include one or more computer servers. For example, computing environment 300 may include a first data server 320 (which may, e.g., be an email server associated with a first email service, such as an email service provided by a first organization), a second data server 325 (which may, e.g., be an email server associated with a second email service, such as an email service provided by a second organization different from the first organization), and a push notification server 330 (which may, e.g., be configured to send one or more push notifications to one or more computing devices, such as client computing device 335, client computing device 340, and/or client computing device 345, on behalf of one or more other servers and/or computing devices, as illustrated below). In some instances, data server 320, data server 325, and/or push notification server 330 may implement, incorporate, and/or otherwise include one or more aspects of computing device 100. In addition, data server 320, data server 325, and/or push notification server 330 may be any type of computing device capable of receiving and processing input via one or more user interfaces, providing output via one or more user interfaces and communicating input, output, and/or other information to and/or from one or more other computing devices. In addition, and as illustrated in greater detail below, any and/or all of data server 320, data server 325, and/or push notification server 330 may, in some instances, be special-purpose computing devices configured to perform specific functions.

Computing environment 300 also may include one or more computing platforms. For example, computing environment 300 may include shadowing proxy computing platform 310. Shadowing proxy computing platform 310 may include one or more computing devices configured to perform one or more of the various functions described herein. For example, shadowing proxy computing platform 310 may include one or more computers (e.g., laptop computers, desktop computers, servers, etc.).

Computing environment 300 also may include one or more networks, which may interconnect one or more of shadowing proxy computing platform 310, data server 320, data server 325, push notification server 330, client computing device 335, client computing device 340, and/or client computing device 345. For example, computing environment 300 may include a network 350, which may include one or more private networks (e.g., one or more networks which may, e.g., be operated by and/or associated with an organization that operates shadowing proxy computing platform 310 and which may include one or more local area networks, wide area networks, virtual private networks, etc.) and/or one or more public networks (which may, e.g., include the internet and/or one or more other networks and which may interconnect one or more private networks and one or more computing devices connected thereto to one or more other computing devices not connected to such private networks).

As illustrated in FIG. 3, shadowing proxy computing platform 310 may include one or more processors 311, memory 313, and a communication interface 312. Memory 313 may store and/or otherwise include one or more program modules that include instructions that, when executed by the one or more processors 311, cause shadowing proxy computing platform 310 to perform one or more functions described herein. For example, memory 313 may store and/or otherwise include proxy client module 314, which may include instructions that, when executed by the one or more processors 311, cause shadowing proxy computing platform 310 to perform one or more functions described herein, such as providing continuous monitoring of one or more data servers using a shadowing proxy. In addition, memory 313 may store, maintain, and/or otherwise provide one or more databases, such as proxy client database 315, in which shadowing proxy computing platform 310 may store and/or maintain various types of information, including information associated with providing continuous monitoring of one or more data servers using a shadowing proxy. Additionally, communication interface 312 may be a network interface configured to support communication between shadowing proxy computing platform 310 and network 350 and/or one or more sub-networks thereof.

Figure 4A:
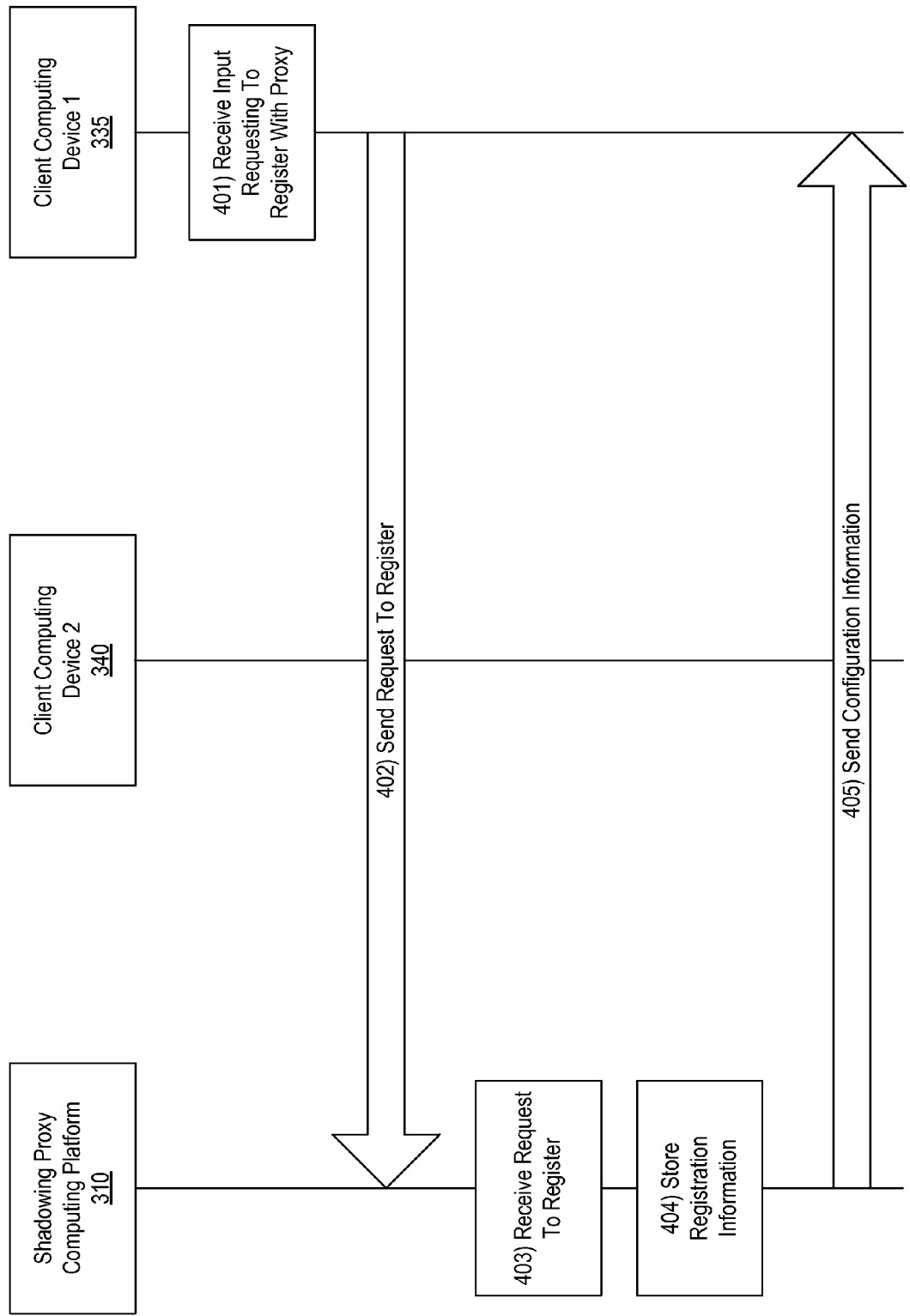

FIGS. 4A-4G depict an example event sequence for providing continuous monitoring of data servers using a shadowing proxy in accordance with one or more example embodiments. As seen in FIGS. 4A-4G, one or more steps of the depicted example event sequence may form all or part of an algorithm that may be performed by one or more computing devices in providing continuous monitoring of data servers using a shadowing proxy in accordance with one or more example embodiments. Referring to FIG. 4A, at step 401, client computing device 335 may receive input requesting to register with a proxy server. At step 402, client computing device 335 may send a request to register to shadowing proxy computing platform 310 (e.g., based on the input received at step 401).

At step 403, shadowing proxy computing platform 310 may receive a request to register from client computing device 335. For example, at step 403, shadowing proxy computing platform 310 may receive, via the communication interface (e.g., communication interface 312), and from the first client computing device (e.g., client computing device 335), a request to register for proxy monitoring of a server associated with a first user account (e.g., data server 320, data server 325). At step 404, shadowing proxy computing platform 310 may store registration information associated with the request to register received from client computing device 335. For example, at step 404, shadowing proxy computing platform 310 may store registration information associated with the request to register for proxy monitoring of the server associated with the first user account. Shadowing proxy computing platform 310 may, for instance, store such registration information to create the smart client proxy associated with the first user account. Additionally or alternatively, the registration information (which may, e.g., be stored by shadowing proxy computing platform 310 at step 404) may include connection settings, credentials, and/or other information needed to enable the smart client proxy associated with the first user account to poll the server for new data on behalf of the first client computing device (e.g., client computing device 335).

At step 405, shadowing proxy computing platform 310 may send configuration information to client computing device 335. For example, at step 405, shadowing proxy computing platform 310 may send, via the communication interface (e.g., communication interface 312), and to the first client computing device (e.g., client computing device 335), configuration information associated with the proxy monitoring of the server associated with the first user account. Shadowing proxy computing platform 310 may, for instance, send such configuration information to enable and/or cause the first client computing device (e.g., client computing device 335) to connect to shadowing proxy computing platform 310 when polling for new data, instead of connecting directly to the data server (e.g., data server 320, data server 325).

Figure 4B:
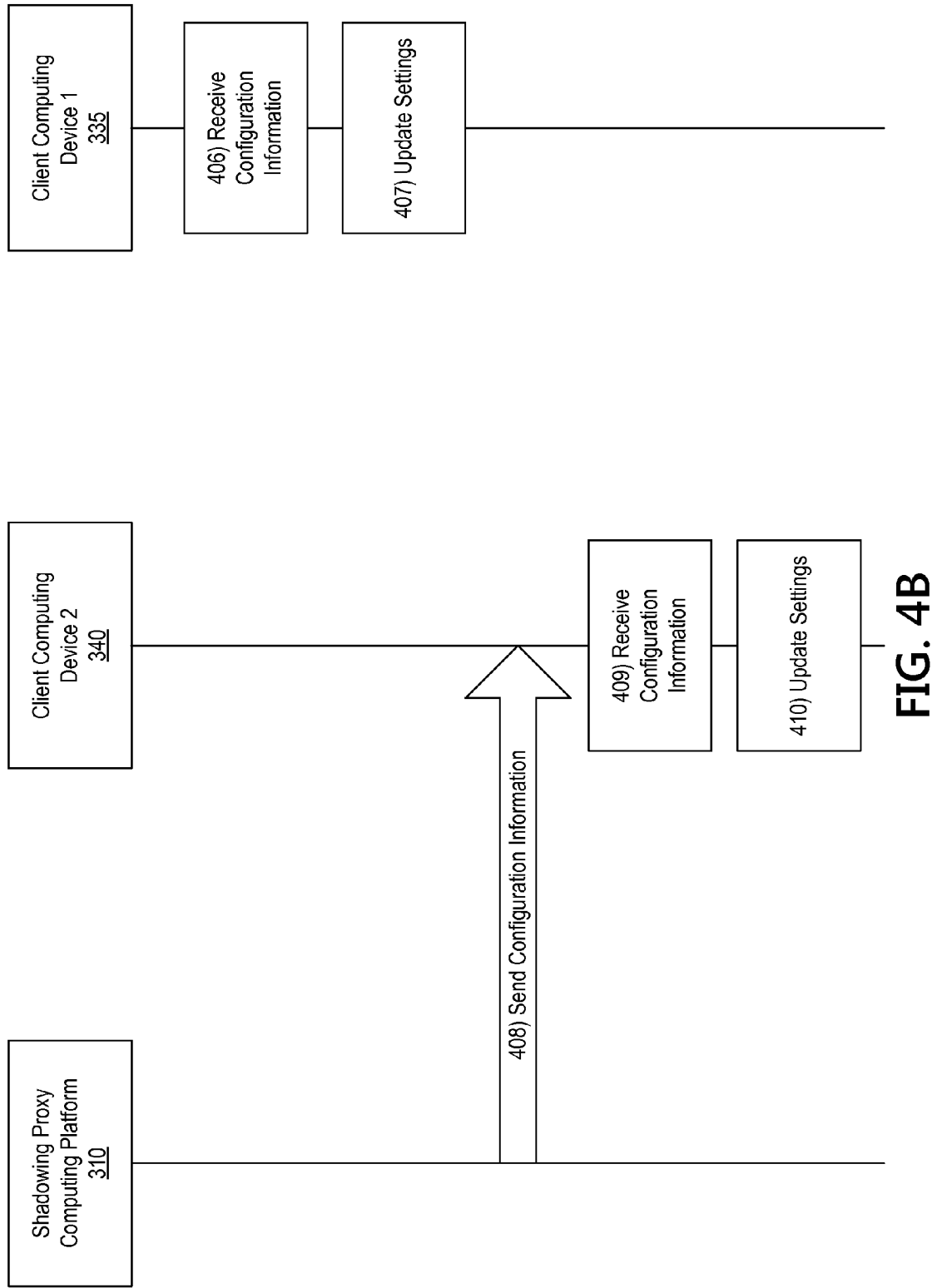

Referring to FIG. 4B, at step 406, client computing device 335 may receive the configuration information from shadowing proxy computing platform 310. At step 407, client computing device 335 may update settings information based on the configuration information received from shadowing proxy computing platform 310.

At step 408, shadowing proxy computing platform 310 may send configuration information to client computing device 340. For example, after sending the configuration information associated with the proxy monitoring of the server associated with the first user account (e.g., at step 405), shadowing proxy computing platform 310 may send, via the communication interface (e.g., communication interface 312), and to a second client computing device (e.g., client computing device 340), second configuration information associated with the proxy monitoring of the server associated with the first user account. For example, the second client computing device (e.g., client computing device 340) may be used by the same user as first client computing device (e.g., client computing device 335), and after configuring proxy monitoring on one client device, shadowing proxy computing platform 310 may automatically configure other devices used by the same user, such as the second client computing device (e.g., client computing device 340), to poll for new data via shadowing proxy computing platform 310 as well. For instance, the second configuration information may enable and/or cause the second client computing device (e.g., client computing device 340) to connect to shadowing proxy computing platform 310 when polling for new data, instead of connecting directly to the data server (e.g., data server 320, data server 325).

At step 409, client computing device 340 may receive the configuration information from shadowing proxy computing platform 310. At step 410, client computing device 340 may update settings information based on the configuration information received from shadowing proxy computing platform 310.

Figure 4C:
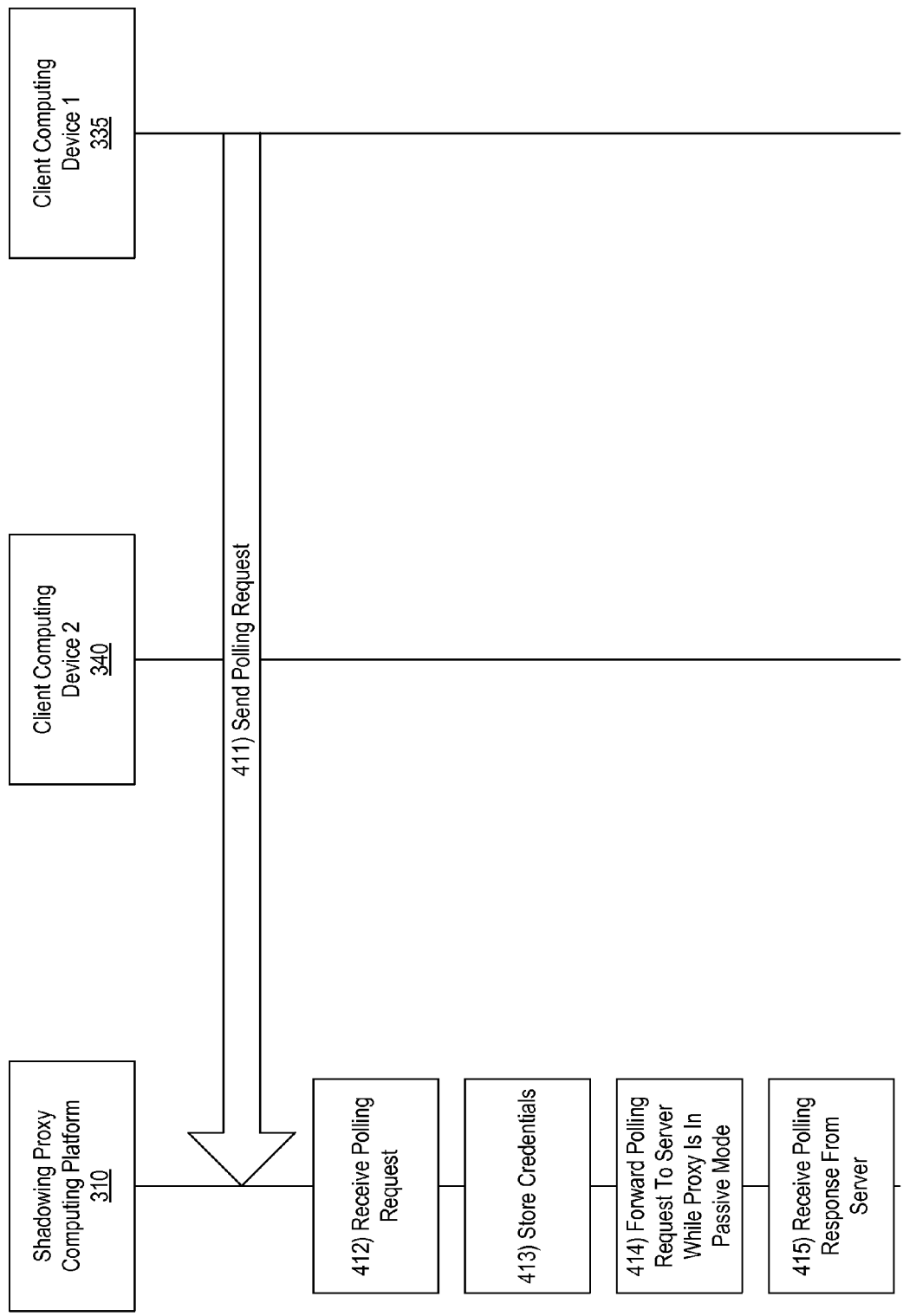

Referring to FIG. 4C, at step 411, client computing device 335 may send a polling request to shadowing proxy computing platform 310. At step 412, shadowing proxy computing platform 310 may receive the polling request from client computing device 335. For example, at step 412, shadowing proxy computing platform 310 may receive, via the communication interface (e.g., communication interface 312), and from a first client computing device (e.g., client computing device 335), a first polling request associated with a first user account, while a smart client proxy associated with the first user account is operating in a passive mode.

In some embodiments, the system may provide a second smart client proxy for a second user account different from the first user account. For example, shadowing proxy computing platform 310 may, in some instances, provide a second smart client proxy for a second user account different from the first user account. For instance, shadowing proxy computing platform 310 may provide multiple smart client proxies for multiple other user accounts that may be used by other users of other devices (e.g., client computing device 345) different from the user of the first client computing device (e.g., client computing device 335).

At step 413, shadowing proxy computing platform 310 may store one or more credentials associated with the polling request received from client computing device 335. For example, at step 413, prior to forwarding the first polling request to the server associated with the first user account, shadowing proxy computing platform 310 may store one or more credentials for accessing the server associated with the first user account. In addition, the one or more credentials for accessing the server associated with the first user account may be received (e.g., by shadowing proxy computing platform 310) from the first client computing device (e.g., client computing device 335) with the first polling request.

In some embodiments, the one or more credentials for accessing the server associated with the first user account may include one or more long-lived credentials, including one or more of a username associated with the first user account or a password associated with the first user account. For example, the one or more credentials for accessing the server associated with the first user account (which may, e.g., be stored by shadowing proxy computing platform 310 at step 413) may include one or more long-lived credentials, such as a username associated with the first user account, a password associated with the first user account, and/or one or more other credentials.

At step 414, shadowing proxy computing platform 310 may forward the polling request to a data server (e.g., data server 320, data server 325, etc.) while a proxy client provided by shadowing proxy computing platform 310 for a user account associated with client computing device 335 is operating in a passive mode. For example, at step 414, shadowing proxy computing platform 310 may forward, via the communication interface (e.g., communication interface 312), the first polling request to a server associated with the first user account, while the smart client proxy associated with the first user account is operating in the passive mode.

Figure 4D:
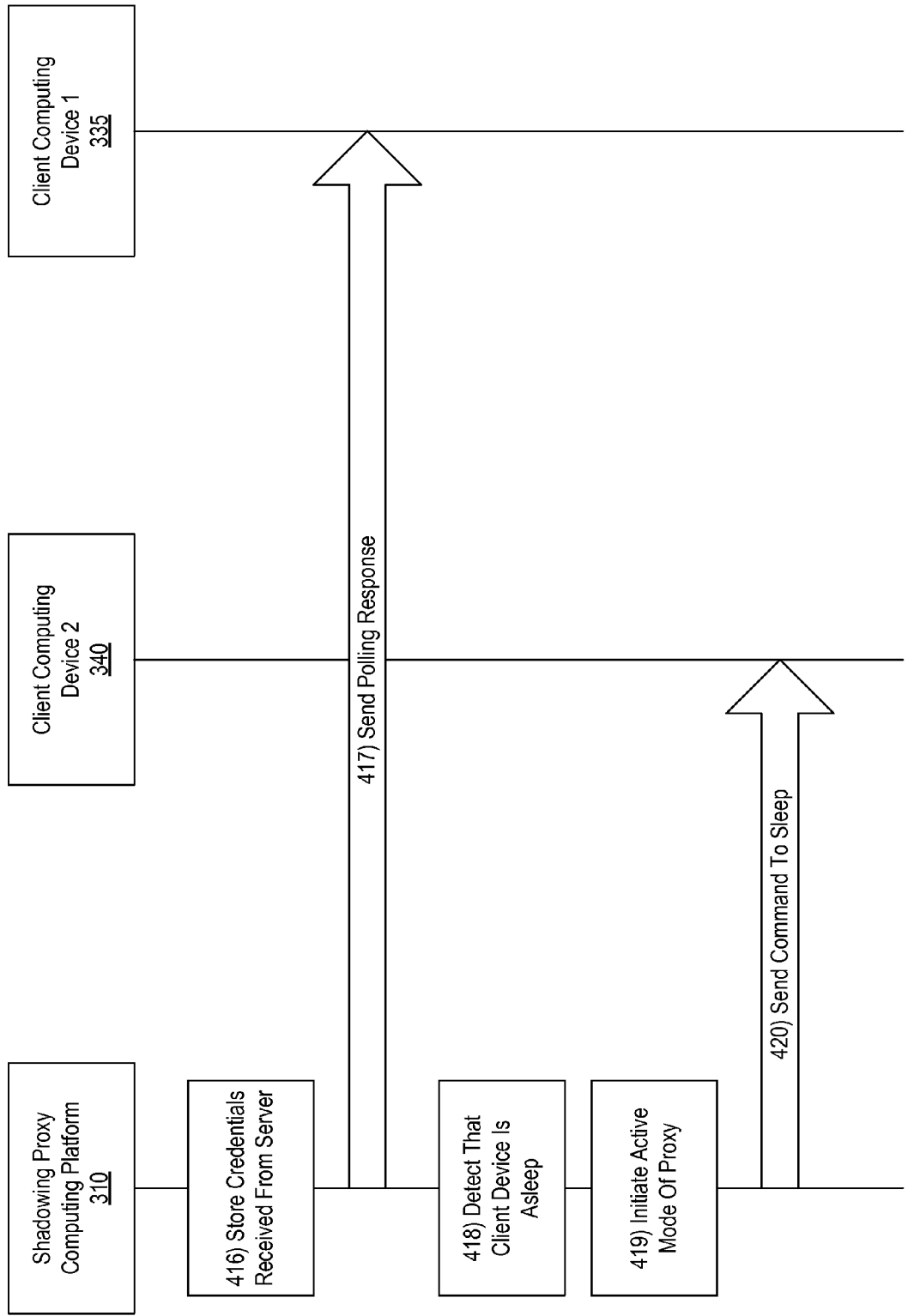

At step 415, shadowing proxy computing platform 310 may receive a polling response from the data server. For example, after forwarding the first polling request to the server associated with the first user account, shadowing proxy computing platform 310 may receive, via the communication interface (e.g., communication interface 312), a first polling response from the server associated with the first user account. In some embodiments, the first polling response received from the server associated with the first user account may include one or more short-lived credentials for accessing the server associated with the first user account. For example, in some instances, the first polling response received from the server associated with the first user account (e.g., at step 415) may include one or more short-lived credentials for accessing the server associated with the first user account. Referring to FIG. 4D, at step 416, shadowing proxy computing platform 310 may store one or more credentials received from the data server and/or associated with the polling response received from the data server. For example, at step 416, shadowing proxy computing platform 310 may store the one or more short-lived credentials for accessing the server associated with the first user account.

In some embodiments, the one or more short-lived credentials for accessing the server associated with the first user account include at least one session cookie. For example, shadowing proxy computing platform 310 may receive a session cookie and/or other short-lived credentials from the server associated with the first user account while polling the server in the passive mode, and the session cookie and/or the other short-lived credentials may be used by the proxy system either on their own or in combination with the long-lived credentials so as to access the server associated with the first user account when polling the server in the active mode, as illustrated in greater detail below.

At step 417, shadowing proxy computing platform 310 may send the polling response received from the data server to client computing device 335. For example, at step 417, shadowing proxy computing platform 310 may send, via the communication interface (e.g., communication interface 312), to the first client computing device (e.g., client computing device 335), the first polling response received from the server associated with the first user account.

At step 418, shadowing proxy computing platform 310 may detect that the client device (e.g., client computing device 335) is asleep. For example, at step 481, shadowing proxy computing platform 310 may detect that the first client computing device (e.g., client computing device 335) is asleep. In some embodiments, detecting that the first client computing device is asleep may include determining that a subsequent polling request has not been received from the first client computing device after a predetermined amount of time elapses from a time when a last polling request was received from the first client computing device. For example, in detecting that the first client computing device (e.g., client computing device 335) is asleep, shadowing proxy computing platform 310 may determine that a subsequent polling request has not been received from the first client computing device (e.g., client computing device 335) after a predetermined amount of time elapses from a time when a last polling request was received from the first client computing device (e.g., client computing device 335). For instance, shadowing proxy computing platform 310 may determine that the first client computing device (e.g., client computing device 335) is asleep based on not receiving a polling request from the first client computing device (e.g., client computing device 335) within a predetermined amount of time (e.g., one minute, two minutes, etc.) of receiving the last polling request from the first client computing device (e.g., client computing device 335). The predetermined amount of time may, for example, be defined in one or more configuration settings used by shadowing proxy computing platform 310. In some instances, the first client computing device (e.g., client computing device 335) may stop polling shadowing proxy computing platform 310 for new data because the first client computing device (e.g., client computing device 335) and/or a client application running on the first client computing device (e.g., client computing device 335) has entered a sleep mode, because the first client computing device (e.g., client computing device 335) has lost its network connection or otherwise cannot connect to shadowing proxy computing platform 310, and/or because of one or more other reasons. For example, in some instances, shadowing proxy computing platform 310 may determine that client computing device 335 is asleep because client computing device 335 has crashed, run out of battery, or otherwise died. In some instances, shadowing proxy computing platform 310 may determine that client computing device 335 is asleep because a client application on client computing device 335 has been actively exited (e.g., by the user of client computing device 335) or has been exited by the operating system running on client computing device 335. In some instances, shadowing proxy computing platform 310 may determine that client computing device 335 is asleep because client computing device 335 has moved outside of a signal coverage area, run out of credit (which may, e.g., be needed by client computing device 335 to connect to and/or exchange data with one or more network service providers), or otherwise ceased communications with shadowing proxy computing platform 310 and/or one or more other computer systems. In some instances, shadowing proxy computing platform 310 may determine that client computing device 335 is asleep because a client operating system running on client computing device 335 has starved a client application on client computing device 335 of computing resources and/or refused or otherwise prevented such a client application from running on client computing device 335.

At step 419, shadowing proxy computing platform 310 may initiate an active mode of the proxy client provided by shadowing proxy computing platform 310 for the user account associated with client computing device 335. For example, in response to detecting that the first client computing device (e.g., client computing device 335) is asleep, shadowing proxy computing platform 310 may initiate an active mode of the smart client proxy associated with the first user account. For instance, the smart client proxy associated with the first user account may operate either in a passive mode in which the smart client proxy receives polling requests from the first client computing device (e.g., client computing device 335) and forwards them on to the server associated with the first user account (e.g., data server 320, data server 325) or in an active mode in which the smart client proxy itself sends polling requests to the server without input or prompting from the first client computing device (e.g., client computing device 335), for instance, because the first client computing device (e.g., client computing device 335) is no longer sending polling requests to shadowing proxy computing platform 310.

At step 420, shadowing proxy computing platform 310 may send a command to sleep to client computing device 340. For example, in response to detecting that the first client computing device is asleep, shadowing proxy computing platform 310 may send, via the communication interface (e.g., communication interface 312), to a second client computing device associated with the first user account (e.g., client computing device 340), a command configured to cause the second client computing device associated with the first user account to enter a sleep mode. For instance, shadowing proxy computing platform 310 may command the second client computing device (e.g., client computing device 340) to enter a sleep mode and/or otherwise discontinue polling shadowing proxy computing platform 310 because shadowing proxy computing platform 310 is going to enter the active mode of operation and start polling the data server, so there is no need for the second client computing device (e.g., client computing device 340) to continue polling shadowing proxy computing platform 310, as shadowing proxy computing platform 310 can notify and/or wake both the first client computing device (e.g., client computing device 335) and the second client computing device (e.g., client computing device 340) if new data becomes available at the data server, as illustrated in greater detail below.

Referring to FIG. 4E, at step 421, shadowing proxy computing platform 310 may send a polling request to the data server. For example, at step 421, shadowing proxy computing platform 310 may send, via the communication interface (e.g., communication interface 312), a second polling request to the server associated with the first user account, while the smart client proxy associated with the first user account is operating in the active mode.

In some embodiments, sending the second polling request to the server associated with the first user account may include sending the one or more long-lived credentials to the server associated with the first user account. For example, in sending the second polling request to the server associated with the first user account, shadowing proxy computing platform 310 may send the one or more long-lived credentials to the server associated with the first user account. For instance, the smart client proxy associated with the first user account may use the stored credentials to access the data server while the smart client proxy associated with the first user account is operating in the active mode (e.g., and polling the data server for new data associated with the first user account on behalf of the client computing device 335 and/or client computing device 340).

In some embodiments, sending the second polling request to the server associated with the first user account may include sending, to the server associated with the first user account, session information associated with the one or more short-lived credentials. For example, in sending the second polling request to the server associated with the first user account, shadowing proxy computing platform 310 may send, to the server associated with the first user account, session information associated with the one or more short-lived credentials. For instance, such session information may include the at least one session cookie and/or other information, and the session information may be received and/or verified by the data server, and may thus enable shadowing proxy computing platform 310 to access the data server associated with the first user account when polling the data server in the active mode.

At step 422, shadowing proxy computing platform 310 may receive a polling response from the data server. At step 423, shadowing proxy computing platform 310 may determine to wake the client device (e.g., client computing device 335). For example, at step 423, shadowing proxy computing platform 310 may determine to wake the first client computing device (e.g., client computing device 335) based on a polling response associated with the second polling request.

In some embodiments, determining to wake the first client computing device based on the polling response associated with the second polling request may include determining to wake the first client computing device based on the polling response associated with the second polling request indicating that new data is available at the server for the first user account. For example, in determining to wake the first client computing device (e.g., client computing device 335) based on the polling response associated with the second polling request, shadowing proxy computing platform 310 may determine to wake the first client computing device (e.g., client computing device 335) based on the polling response associated with the second polling request indicating that new data is available at the server for the first user account. In some instances, shadowing proxy computing platform 310 may determine that a specific type of new data is available and/or determine that a specific amount of new data is available, and thus may decide to wake the first client computing device (e.g., client computing device 335) accordingly. In some instances, one or more policies and/or settings that may be used by shadowing proxy computing platform 310 and/or that may be defined by the user of the first client computing device (e.g., client computing device 335) and/or by one or more network administrators may define one or more circumstances and/or conditions for waking the first client computing device (e.g., client computing device 335) and/or otherwise sending notifications to the first client computing device (e.g., client computing device 335) and/or the second client computing device (e.g., client computing device 340).

In some embodiments, determining to wake the first client computing device based on the polling response associated with the second polling request may include determining to wake the first client computing device based on the polling response associated with the second polling request indicating that one or more stored credentials used in accessing the server associated with the first user account have expired. For example, in determining to wake the first client computing device (e.g., client computing device 335) based on the polling response associated with the second polling request, shadowing proxy computing platform 310 may determine to wake the first client computing device (e.g., client computing device 335) based on the polling response associated with the second polling request indicating that one or more stored credentials used in accessing the server associated with the first user account have expired. For instance, shadowing proxy computing platform 310 may determine to wake the first client computing device (e.g., client computing device 335) based on the expiration of stored credentials being used by the client proxy on shadowing proxy computing platform 310 to access the data server, as waking the first client computing device (e.g., client computing device 335) may cause the client proxy on shadowing proxy computing platform 310 to re-enter the passive mode, as illustrated below, in which shadowing proxy computing platform 310 may receive updated credentials from the first client computing device (e.g., client computing device 335), such as one or more updated long-lived credentials, and/or from the data server, such as one or more updated short-lived credentials.

At step 424, shadowing proxy computing platform 310 may send a notification to client computing device 335. For example, in response to determining to wake the first client computing device (e.g., client computing device 335) based on the polling response associated with the second polling request, shadowing proxy computing platform 310 may send, via the communication interface (e.g., communication interface 312), and to the first client computing device (e.g., client computing device 335), a notification to wake the first client computing device (e.g., client computing device 335). At step 425, shadowing proxy computing platform 310 may send a notification to client computing device 340. For example, after sending the notification to wake the first client computing device (e.g., client computing device 335), shadowing proxy computing platform 310 may send, via the communication interface (e.g., communication interface 312), and to a second client computing device associated with the first user account (e.g., client computing device 340), a notification to wake the second client computing device associated with the first user account (e.g., client computing device 340).

In some additional and/or alternative instances, instead of determining to wake the first client computing device (e.g., client computing device 335) based on the polling response associated with the second polling request and sending a notification to wake the first client computing device (e.g., client computing device 335), shadowing proxy computing platform 310 may identify and/or detect a message to be sent to the first client computing device (e.g., client computing device 335) that might not actually wake the first client computing device (e.g., client computing device 335). For example, shadowing proxy computing platform 310 may send a text message or other message to the first client computing device (e.g., client computing device 335) indicating that new mail or other content is available at the server, which may lead the user of the first client computing device (e.g., client computing device 335) to restart a client application on the first client computing device (e.g., client computing device 335) themselves, and the client application on the first client computing device (e.g., client computing device 335) then may resume polling shadowing proxy computing platform 310 for new data having been restarted manually by the user of the first client computing device (e.g., client computing device 335).

Figure 4F:
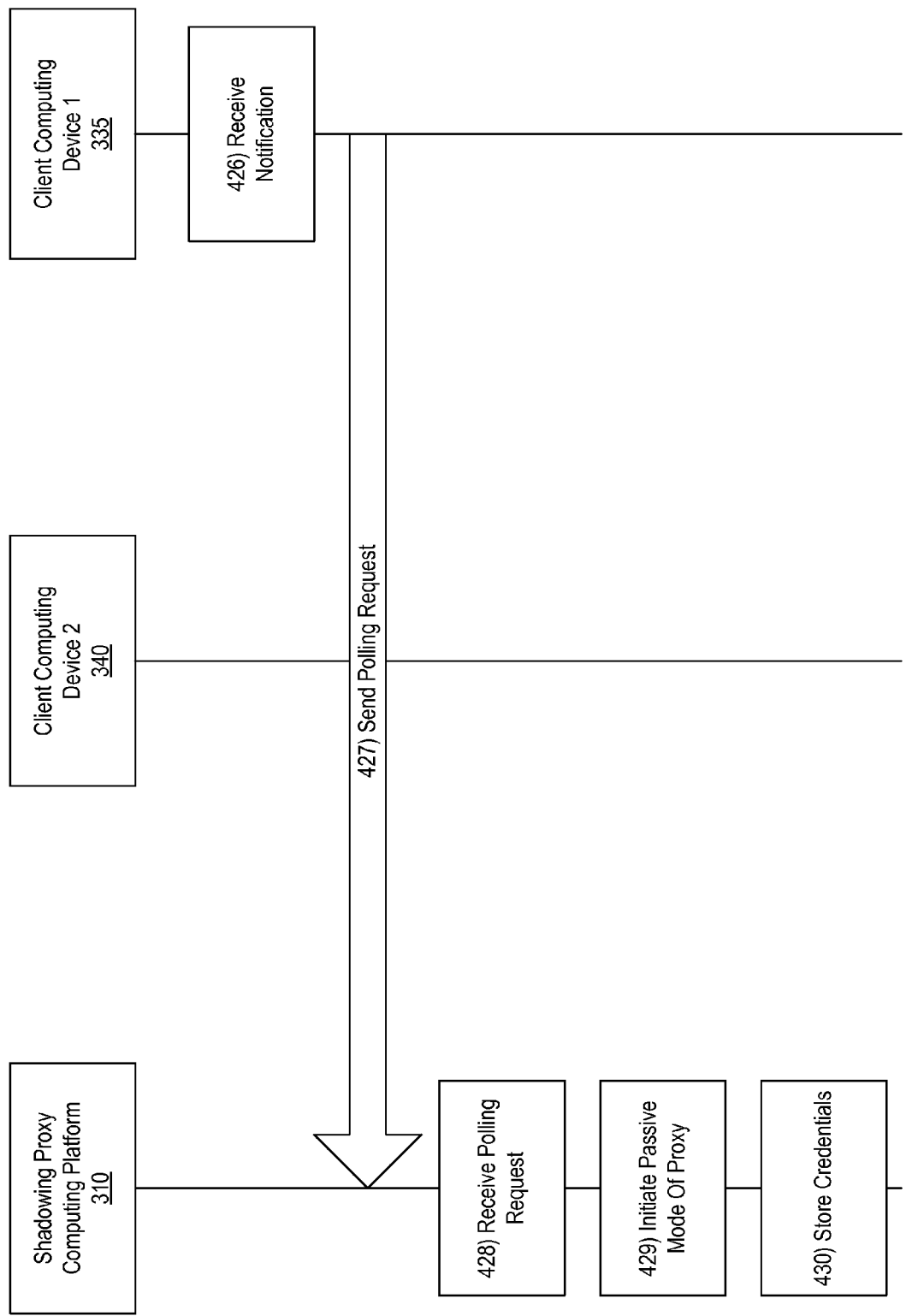

Referring to FIG. 4F, at step 426, client computing device 335 may receive the notification from shadowing proxy computing platform 310. At step 427, client computing device 335 may send a polling request to shadowing proxy computing platform 310. At step 428, shadowing proxy computing platform 310 may receive the polling request from client computing device 335. For example, after sending the notification to wake the first client computing device (e.g., client computing device 335), shadowing proxy computing platform 310 may receive, via the communication interface (e.g., communication interface 312), and from the first client computing device (e.g., client computing device 335), a third polling request associated with the first user account, while the smart client proxy associated with the first user account is operating in the active mode.

At step 429, shadowing proxy computing platform 310 may initiate a passive mode of the proxy client provided by shadowing proxy computing platform 310 for the user account associated with client computing device 335. For example, in response to receiving the third polling request associated with the first user account from the first client computing device (e.g., client computing device 335), shadowing proxy computing platform 310 may initiate the passive mode of the smart client proxy associated with the first user account. For instance, at step 429, shadowing proxy computing platform 310 may switch the proxy client from the active mode back into the passive mode, as the first client computing device (e.g., client computing device 335) is once again awake and actively polling shadowing proxy computing platform 310, which is in turn is polling the data server.

Figure 4G:
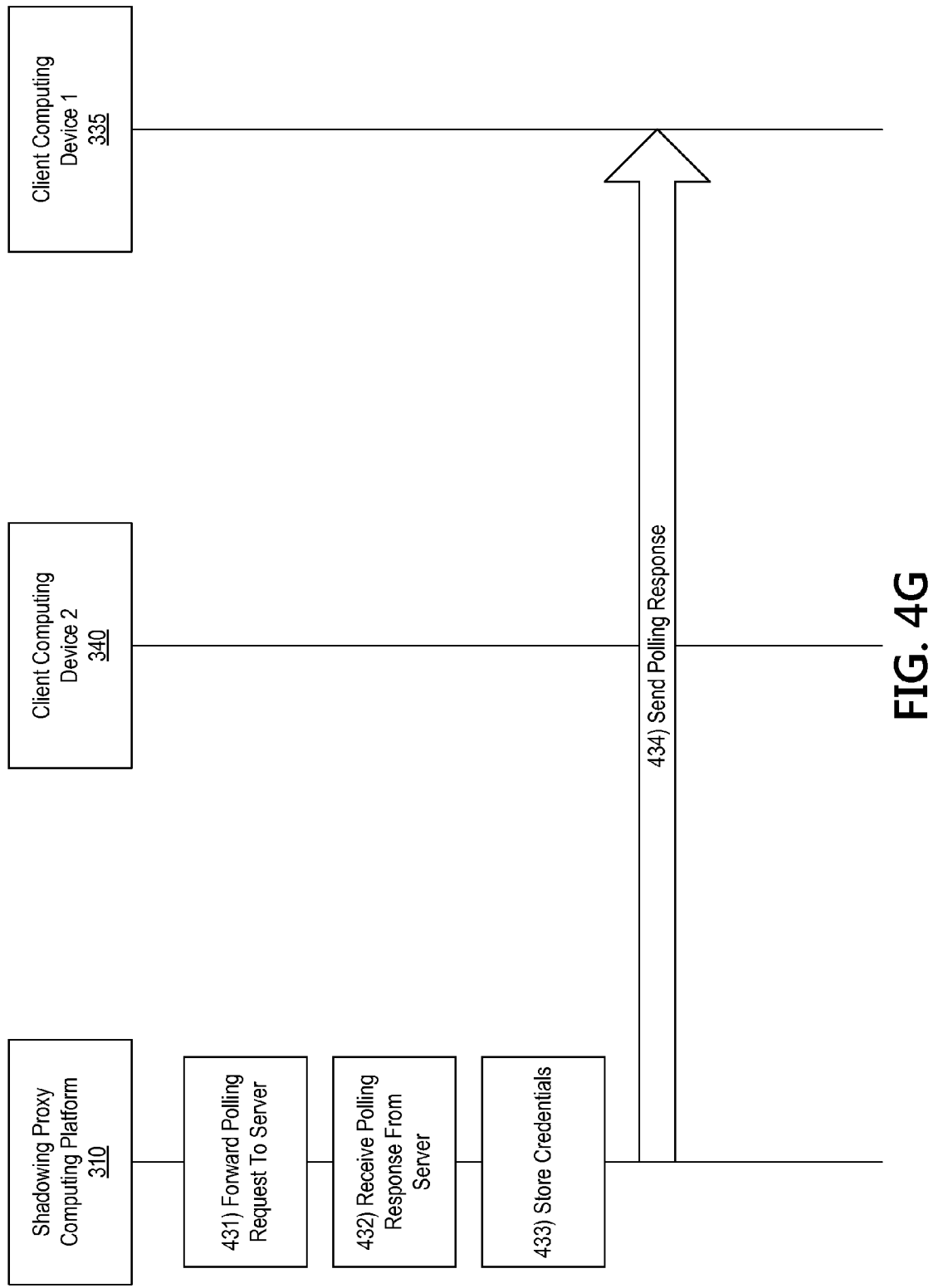

At step 430, shadowing proxy computing platform 310 may store one or more credentials associated with the polling request received from client computing device 335 (e.g., similar to how shadowing proxy computing platform 310 may store one or more credentials at step 413, as discussed above). Referring to FIG. 4G, at step 431, shadowing proxy computing platform 310 may forward the polling request to the data server (e.g., similar to how shadowing proxy computing platform 310 may forward the polling request to the data server at step 414, as discussed above). At step 432, shadowing proxy computing platform 310 may receive a polling response from the data server (e.g., similar to how shadowing proxy computing platform 310 may receive a polling response from the data server at step 415, as discussed above). At step 433, shadowing proxy computing platform 310 may store one or more credentials received from the data server and/or associated with the polling response received from the data server (e.g., similar to how shadowing proxy computing platform 310 may store such credentials at step 416, as discussed above). At step 434, shadowing proxy computing platform 310 may send the polling response to client computing device 335 (e.g., similar to how shadowing proxy computing platform 310 may send such a polling response at step 417, as discussed above).

Thereafter, the event sequence may continue, with the proxy client on shadowing proxy computing platform 310 switching between the active mode and the passive mode based on whether client computing device 335 is polling shadowing proxy computing platform 310 for new information from the server in connection with the user account associated with shadowing proxy computing platform 310. Additionally or alternatively, one or more other proxy clients running on and/or provided by shadowing proxy computing platform 310 for other user accounts and/or other devices may continue operating in a similar manner, so as to provide continuous monitoring of one or more data servers using a shadowing proxy to one or more other users.

Figure 5:
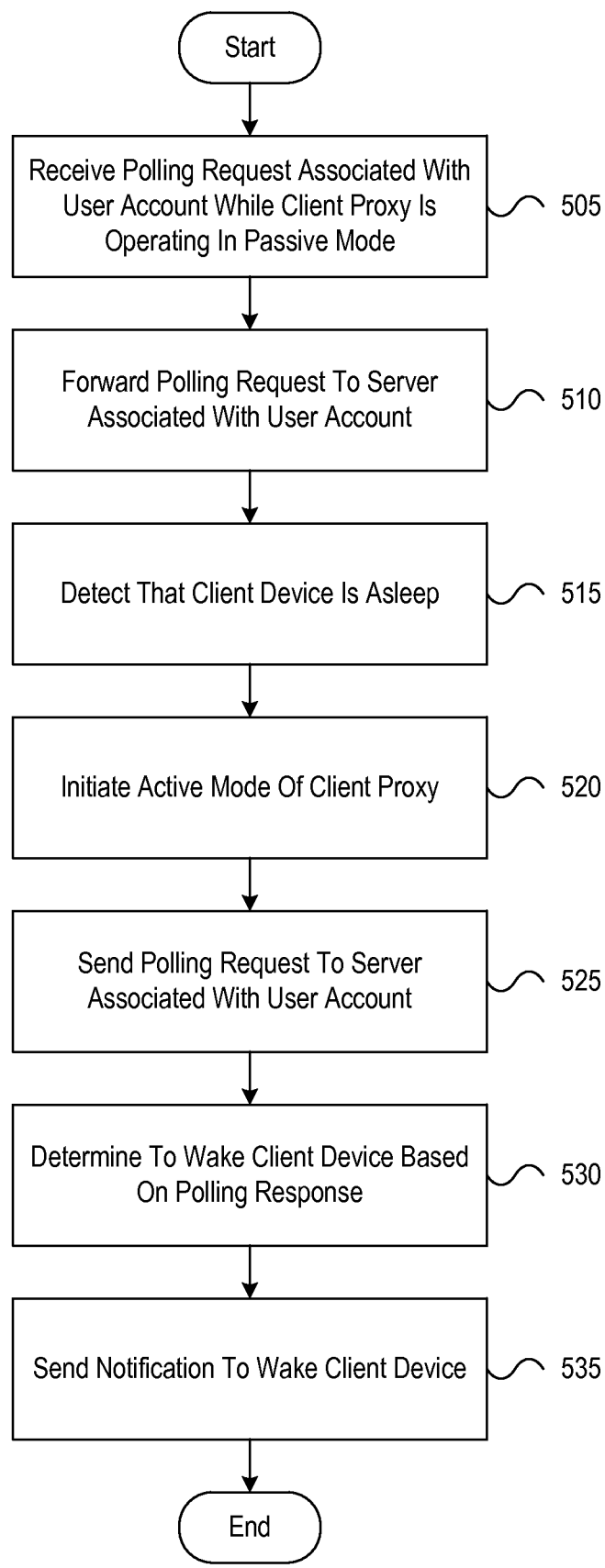
FIG. 5 depicts an illustrative method for providing continuous monitoring of data servers using a shadowing proxy in accordance with one or more example embodiments.

FIG. 5 depicts an illustrative method for providing continuous monitoring of data servers using a shadowing proxy in accordance with one or more example embodiments. Referring to FIG. 5, at step 505, a computing platform may receive, from a first client computing device, a first polling request associated with a first user account, while a smart client proxy associated with the first user account is operating in a passive mode. At step 510, the computing platform may forward the first polling request to a server associated with the first user account, while the smart client proxy associated with the first user account is operating in the passive mode. At step 515, the computing platform may detect that the first client computing device is asleep. At step 520, in response to detecting that the first client computing device is asleep, the computing platform may initiate an active mode of the smart client proxy associated with the first user account. At step 525, the computing platform may send a second polling request to the server associated with the first user account, while the smart client proxy associated with the first user account is operating in the active mode. At step 530, the computing platform may determine to wake the first client computing device based on a polling response associated with the second polling request. At step 535, in response to determining to wake the first client computing device based on the polling response associated with the second polling request, the computing platform may send, to the first client computing device, a notification to wake the first client computing device.

As illustrated above, various aspects of the disclosure relate to providing continuous monitoring of data servers using a shadowing proxy. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A system, comprising:
    at least one processor;
    a communication interface communicatively coupled to the at least one processor; and
    memory storing computer-readable instructions that, when executed by the at least one processor, cause the system to:
        receive, via the communication interface, from a first client computing device, a first polling request associated with a first user account, while a smart client proxy associated with the first user account is operating in a passive mode;
        forward, via the communication interface, the first polling request to a server associated with the first user account, while the smart client proxy associated with the first user account is operating in the passive mode;
        detect that the first client computing device is asleep;
        in response to detecting that the first client computing device is asleep:
            send, via the communication interface, to a second client computing device associated with the first user account, a command configured to cause the second client computing device associated with the first user account to enter a sleep mode; and
            initiate an active mode of the smart client proxy associated with the first user account;
        send, via the communication interface, a second polling request to the server associated with the first user account, while the smart client proxy associated with the first user account is operating in the active mode;
        determine to wake the first client computing device based on a polling response associated with the second polling request; and
        in response to determining to wake the first client computing device based on the polling response associated with the second polling request, send, via the communication interface, to the first client computing device, a notification to wake the first client computing device.

2. The system of claim 1, wherein the system provides a second smart client proxy for a second user account different from the first user account.

3. The system of claim 1, wherein detecting that the first client computing device is asleep comprises determining that a subsequent polling request has not been received from the first client computing device after a predetermined amount of time elapses from a time when a last polling request was received from the first client computing device.

4. The system of claim 1, wherein determining to wake the first client computing device based on the polling response associated with the second polling request comprises determining to wake the first client computing device based on the polling response associated with the second polling request indicating that new data is available at the server for the first user account.

5. The system of claim 1, wherein determining to wake the first client computing device based on the polling response associated with the second polling request comprises determining to wake the first client computing device based on the polling response associated with the second polling request indicating that one or more stored credentials used in accessing the server associated with the first user account have expired.

6. The system of claim 1, wherein the memory stores additional computer-readable instructions that, when executed by the at least one processor, further cause the system to:
    after sending the notification to wake the first client computing device, send, via the communication interface, to a second client computing device associated with the first user account, a notification to wake the second client computing device associated with the first user account.

7. The system of claim 1, wherein the memory stores additional computer-readable instructions that, when executed by the at least one processor, further cause the system to:
    after sending the notification to wake the first client computing device:
        receive, via the communication interface, from the first client computing device, a third polling request associated with the first user account, while the smart client proxy associated with the first user account is operating in the active mode; and
        in response to receiving the third polling request associated with the first user account from the first client computing device, initiate the passive mode of the smart client proxy associated with the first user account.

8. The system of claim 1, wherein sending the command configured to cause the second client computing device associated with the first user account to enter the sleep mode causes the second client computing device associated with the first user account to discontinue sending polling requests to the system.

9. The system of claim 1, wherein the memory stores additional computer-readable instructions that, when executed by the at least one processor, further cause the system to:
    prior to receiving the first polling request associated with the first user account:
        receive, via the communication interface, from the first client computing device, a request to register for proxy monitoring of the server associated with the first user account;
        store registration information associated with the request to register for proxy monitoring of the server associated with the first user account; and
        send, via the communication interface, to the first client computing device, configuration information associated with the proxy monitoring of the server associated with the first user account.

10. The system of claim 9, wherein the memory stores additional computer-readable instructions that, when executed by the at least one processor, further cause the system to:

after sending the configuration information associated with the proxy monitoring of the server associated with the first user account, send, via the communication interface, to a second client computing device, second configuration information associated with the proxy monitoring of the server associated with the first user account.

11. The system of claim 1, wherein the memory stores additional computer-readable instructions that, when executed by the at least one processor, further cause the system to:

prior to forwarding the first polling request to the server associated with the first user account, store one or more credentials for accessing the server associated with the first user account, the one or more credentials for accessing the server associated with the first user account being received from the first client computing device with the first polling request.

12. The system of claim 11, wherein the one or more credentials for accessing the server associated with the first user account comprise one or more long-lived credentials, including one or more of a username associated with the first user account or a password associated with the first user account.

13. The system of claim 12, wherein sending the second polling request to the server associated with the first user account comprises sending the one or more long-lived credentials to the server associated with the first user account.

14. The system of claim 1, wherein the memory stores additional computer-readable instructions that, when executed by the at least one processor, further cause the system to:

after forwarding the first polling request to the server associated with the first user account, receive, via the communication interface, a first polling response from the server associated with the first user account; and send, via the communication interface, to the first client computing device, the first polling response received from the server associated with the first user account.

15. The system of claim 14, wherein the first polling response received from the server associated with the first user account comprises one or more short-lived credentials for accessing the server associated with the first user account, and wherein the memory stores additional computer-readable instructions that, when executed by the at least one processor, further cause the system to store the one or more short-lived credentials for accessing the server associated with the first user account.

16. The system of claim 15, wherein the one or more short-lived credentials for accessing the server associated with the first user account include at least one session cookie.

17. The system of claim 15, wherein sending the second polling request to the server associated with the first user account comprises sending, to the server associated with the first user account, session information associated with the one or more short-lived credentials.

18. A method, comprising:

at a computing platform comprising at least one processor, memory, and a communication interface:

receiving, by the at least one processor, via the communication interface, from a first client computing device, a first polling request associated with a first user account, while a smart client proxy associated with the first user account is operating in a passive mode;

forwarding, by the at least one processor, via the communication interface, the first polling request to a server associated with the first user account, while the smart client proxy associated with the first user account is operating in the passive mode;

detecting, by the at least one processor, that the first client computing device is asleep;

in response to detecting that the first client computing device is asleep:

sending, by the at least one processor, via the communication interface, to a second client computing device associated with the first user account, a command configured to cause the second client computing device associated with the first user account to enter a sleep mode; and initiating, by the at least one processor, an active mode of the smart client proxy associated with the first user account;

sending, by the at least one processor, via the communication interface, a second polling request to the server associated with the first user account, while the smart client proxy associated with the first user account is operating in the active mode;

determining, by the at least one processor, to wake the first client computing device based on a polling response associated with the second polling request; and in response to determining to wake the first client computing device based on the polling response associated with the second polling request, sending, by the at least one processor, via the communication interface, to the first client computing device, a notification to wake the first client computing device.

19. The method of claim 18, wherein detecting that the first client computing device is asleep comprises determining that a subsequent polling request has not been received from the first client computing device after a predetermined amount of time elapses from a time when a last polling request was received from the first client computing device.

20. One or more non-transitory computer-readable media storing instructions that, when executed by a computer system comprising at least one processor, memory, and a communication interface, cause the computer system to:

receive, via the communication interface, from a first client computing device, a first polling request associated with a first user account, while a smart client proxy associated with the first user account is operating in a passive mode;

forward, via the communication interface, the first polling request to a server associated with the first user account, while the smart client proxy associated with the first user account is operating in the passive mode;

detect that the first client computing device is asleep;

in response to detecting that the first client computing device is asleep:

send, via the communication interface, to a second client computing device associated with the first user account, a command configured to cause the second client computing device associated with the first user account to enter a sleep mode; and initiate an active mode of the smart client proxy associated with the first user account;
send, via the communication interface, a second polling request to the server associated with the first user account, while the smart client proxy associated with the first user account is operating in the active mode;
determine to wake the first client computing device based on a polling response associated with the second polling request; and
in response to determining to wake the first client computing device based on the polling response associated with the second polling request, send, via the communication interface, to the first client computing device, a notification to wake the first client computing device.

* * * * *